United States Patent Office 3,449,112
Patented June 10, 1969

3,449,112
P-ISOTHIOCYANATOBENZOATES AS HERBICIDES
Alan J. Lemin, Richland, Mich., assignor to The Upjohn Company, Kalamazoo, Mich., a corporation of Delaware
No Drawing. Filed Feb. 4, 1966, Ser. No. 536,569
Int. Cl. A01n *9/18;* C07c *161/04*
U.S. Cl. 71—104                                6 Claims

ABSTRACT OF THE DISCLOSURE

Certain lower-alkyl p-isothiocyanatobenzoates have been found to be useful as herbicides. Herbicidal activity is also present when the benzene ring is substituted with a methyl group, a nitro group, a halogen atom, a methoxy or ethoxy group, or another isothiocyanato group. The compounds are prepared by known methods. Rates of application and representative herbicidal compositions are described.

---

This invention pertains to a novel herbicidal method and novel herbicidal compositions. The invention is more particularly directed to the herbicidal method utilizing, and herbicidal compositions comprising, lower-alkyl p-isothiocyanatobenzoates of the formula:

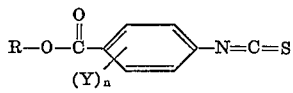

wherein Y is methyl, nitro, halogen, methoxy, ethoxy, or isothiocyanato; $n$ is an integer from 0 to 2, inclusive; and R is lower alkyl of from 1 to 4 carbon atoms, inclusive, e.g., methyl, ethyl, propyl, isopropyl, sec. butyl, and the like.

As a general class of compounds, lower-alkyl p-isothiocyanatobenzoates according to Formula I are known, and the compounds can be prepared by known syntheses. Illustratively some known lower-alkyl p-isothiocyanatobenzoates include methyl p-isothiocyanatobenzoate and ethyl p-isothiocyanatobenzoate.

The compounds according to Formula I are prepared according to the thiophosgene and carbon disulfide methods described in Organic Syntheses Collective, vol. 1, pp. 165 and 447, [Gilman and Blatt, John Wiley & Sons, Inc., New York (2nd ed., 1948)]. Another method for preparing lower-alkyl p-isothiocyanatobenzoates according to Formula I is described by A. A. R. Sayigh, Henri Ulrich, and J. S. Potts in J. Org. Chem., 30, p. 2465 (1965).

According to the Sayigh, Ulrich, and Potts new method a lower-alkyl p-aminobenzoate, for example, ethyl 2,4-diaminobenzoate, ethyl 4-amino-3-bromobenzoate, propyl 4-amino-3-bromobenzoate, methyl 4-amino-2-bromo-5-nitrobenzoate, ethyl 4-amino-2-chlorobenzoate, ethyl 4-amino-2-chloro-5-nitrobenzoate, ethyl 4 - amino - 3,5 - dibromobenzoate, methyl 4-amino-3,5-dichlorobenzoate, ethyl 4-amino-3,5-dimethoxybenzoate, ethyl 4-amino-3-ethoxybenzoate, ethyl 4-amino-2-methoxybenzoate, ethyl 4-amino-2-methoxy-5-nitrobenzoate, ethyl 4-amino-2-nitrobenzoate, methyl 4 - amino - 2,6 - dimethylbenzoate, and methyl 4-amino-3,5-dinitrobenzoate is reacted with diethylthiocarbamoyl chloride by heating in the presence of an inert organic solvent. The corresponding ethyl 2,4-diisothiocyanatobenzoate, ethyl p-isothiocyanato-3-bromobenzoate, propyl p-isothiocyanato - 3 - bromobenzoate, methyl p-isothiocyanato-2-bromo-5-nitrobenzoate, ethyl p-isothiocyanato-2-chlorobenzoate, ethyl p-isothiocyanato-2-chloro-5-nitrobenzoate, ethyl p-isothiocyanato-3,5-dibromo benzoate, methyl p-isothiocyanato-3,5-dichlorobenzoate, ethyl p-isothiocyanato-3,5-dimethoxybenzoate, ethyl p-isothiocyanato-3-ethoxybenzoate, ethyl p-isothiocyanato-2-methoxybenzoate, ethyl p-isothiocyanato - 2 - methoxy-5-nitrobenzoate, ethyl p-isothiocyanato-2-nitrobenzoate, methyl p-isothiocyanato-2,6-dimethylbenzoate, and methyl p-isothiocyanato-3,5-dinitrobenzoate, respectively, are recovered and purified by cooling the reaction mixture, filtering to remove the diethylamine hydrochloride precipitate that forms, removing the solvent by distillation, and recrystallization.

It has now been found, in accordance with this invention that lower-alkyl p-isothiocyanatobenzoates according to Formula I are effective herbicides and can be used to prevent damage to field crops by weed competition. Also, the compounds can be used to prevent unsightly growths of weeds on home lawns, golf courses, cemeteries, railroad right-of-ways, and public commons.

For purposes according to the method of this invention, compounds of Formula I are formulated in herbicidal compositions. Such compositions in accordance with the invention include solutions, emulsions, suspensions, dispersible powders, emulsifiable concentrates, granular formulations, and dusts. All of these compositions comprise the lower-alkyl p-isothiocyanatobenzoates in dispersed or readily dispersible form and a carrier, with or without adjuvants. In general, selective inhibition of undesired weed species in the presence of field crops or in turf is obtained by employing a phytonomic carrier, that is to say, a carrier which can be applied to plants without phytotoxicity or other adverse effects. On the other hand, when general herbicidal activity is desired a phytotoxic carrier, for example, high-boiling mineral oil fractions or chlorohydrocarbons can be used.

The efficacy of lower-alkyl p-isothiocyanatobenzoates according to Formula I as herbicides is of high order, and the compounds can be applied at relatively low rates per acre for controlling growth of weed plants. Illustratively, ethyl p-isothiocyanatobenzoate gave complete or substantially complete suppression of crabgrass *Digitaria sanguinalis,* wild oats *Avena fatua,* quackgrass *Agropyron repens,* bindweed *Convolvulus arvensis,* lambsquarters *Chenopodium album,* and pigweed *Amaranthus retroflexus,* when applied at rates of about 20 lbs. per acre. Rates of application of about 1 to about 8 lbs. per acre are efficacious under most conditions, depending upon the particular circumstances such as type of soil, amount of rainfall or irrigation, and the most prevalent kinds of weeds. At the high rates of application, e.g., at 20 to 50 lbs. per acre the compounds have general herbicidal activity.

Preferred lower-alkyl p-isothiocyanatobenzoates according to the invention include methyl p-isothiocyanatobenzoate, ethyl p-isothiocyanatobenzoate, propyl p-isothiocyanatobenzoate, and butyl p-isothiocyanatobenzoate.

Illustratively, excellent control of weeds in cornfields has been obtained, without damage to the corn plants, using concentrations of ethyl p-isothiocyanatobenzoate ranging from about 156 p.p.m. (parts per million) to about 1250 p.p.m. applied at the rates of about 1.25 to about 5 lbs. per acre. In general, a desired rate of application can be achieved by distributing, over the area to be treated, and aqueous composition in accordance with the invention, containing from about 700 p.p.m. to about 30,000 p.p.m. of active ingredient. It will be understood, of course, that a choice of concentration of active ingredient depends upon the method of application as well as the type of composition and the degree of herbicidal control desired. In general, concentration is not critical within the range indicated since an effective quantity of active ingredient can be applied to a given area by applying greater quantities of a low concentration than of a higher concentration. The concentration of active ingredient in the dispersible powder and emulsifiable concentrates from which the aqueous compositions are prepared can be as high as 99.5% by weight. The concentration of active ingredient in the dust and granular formulations of the invention can vary from about 0.25% to about 80% or more, but advantageously is of the order of 0.50% to 20%.

The granular formulations of this invention are prepared with about 0.25% to about 80%, preferably 0.50% to 20% by weight, of active ingredient and a granular carrier, for example, vermiculite, pyrophyllite, and attapulgite. The active ingredient can be dissolved in a volatile solvent such as methylene chloride, acetone, and the like, and sprayed on the granular carrier as it is mixed and tumbled. The granules are then dried. The granular carrier can range in particle size from about 10 to about 60 mesh, preferably about 30 to 60 mesh.

The herbicidal dust compositions of the invention are prepared by intimate admixture of from about 0.25% to about 80% by weight, preferably 0.50% to 20% of the active ingredient with a solid pulverulent carrier which maintains the composition in a dry, free-flowing state. The herbicidal dusts of the invention can be prepared by admixing a lower-alkyl p-isothiocyanatobenzoate with a solid diluent and then milling. Preferably, however, the active ingredient is dissolved in a volatile organic solvent, of the kinds indicated above, and then sprayed on the solid carrier so as to assure thorough distribution. The mixture is then dried and milled to the desired size, e.g., less than about 60 microns.

Solid carriers that can be used in the dust compositions of the invention include the natural clays such as China clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, precipitated calcium silicate, and colloidal silica. The solid diluents which can be employed in the compositions also include solid, compounded fertilizers. Such solid compositions can be applied to vegetation in the form of dusts by the use of conventional machinery.

A preferred composition, in accordance with the invention, is a dispersible powder which is prepared by incorporating a surfactant in a dust composition prepared as described above. Such a dispersible powder can be dispersed in water to any desired concentration and applied to vegetation by conventional spray equipment. Conveniently, the dispersible powders are formulated with higher concentrations of active ingredient than the dust compositions, for example, up to about 90%, preferably about 10% to 80%. Surfactants useful in preparing such dispersible powder compositions include alkyl sulfates and sulfonate, alkyl aryl sulfonate, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul N₄S). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to soil, plant growth media, or turf at the rate of 40 gals. per acre to give a total application of active ingredient of 1 lb. per acre.

The compounds of this invention can be applied to soil, plant growth media, and turf in aqueous sprays without a solid carrier. However, since the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as acetone is used the solvent carrier will dissolve in the water and any excess lower-alkyl p-isothiocyanatobenzoate will be thrown out of solution. In an emulsion, the solvent phase is dispersed in the water phase and the active ingredient is held in solution in the dispersed phase. In this way, uniform distribution of active ingredient in an aqueous spray is achieved. A solvent carrier in which lower-alkyl p-isothiocyanatobenzoates according to Formula I are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing germination of undesired seeds and controlling growth of plants.

The emulsifiable concentrates of the invention are prepared by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed if desired.

Advantageously, the concentration of active ingredient in the emulsifiable concentrates can range from about 5% to about 50% by weight, preferably from about 10% to 40%. A concentrate comprising 20% (by weight) of the compound dissolved in a water-immiscible solvent of the kind noted above can be admixed with an aqueous medium in the proportions of 13 ml. of concentrate with 1 gal.

of medium to give a mixture containing 700 parts of active ingredient per million parts of liquid carrier. Similarly, 1 qt. of a 20% concentrate mixed with 40 gals. of water provides about 1000 p.p.m. of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include solubilized lignins, such as calcium lignosulfonate, and the like.

The rates of application to soils, plant growth media, or turf to be protected from noxious weeds will depend upon the species of vegetation to be controlled, the presence or absence of desirable species, the season of year at which treatment is undertaken, and the method and efficiency of application. In general, selective herbicidal activity is obtained when the compounds are applied at the rate of about 1.0 to about 15 lbs. per acre, preferably at the rate of about 1.0 to about 8 lbs. per acre.

The compositions containing lower-alkyl p-isothiocyanatobenzoates according to Formula I can be applied to soil, plant growth media, and turf by conventional methods. For example, an area of soil can be treated prior to or after seeding by spraying wettable powder suspensions, emulsions, or solutions from boom-type power sprayers or from hand-operated knapsack sprayers. Dusts can be applied by power dusters, or by hand-operated dusters. Dusts and granular formulations can also be applied at the time of seeding in bands spanning the seeded rows.

The following examples are illustrative of the process and products of the present invention, but are not to be construed as limiting.

EXAMPLE 1

A dispersible powder concentrate having the following percentage composition:

|  | Percent |
|---|---|
| Ethyl p-isothiocyanatobenzoate | 45.8 |
| Polymerized sodium salt of substituted benzoid long-chain sulfonic acid (Daxad 27) | 9.2 |
| Kaolinite | 45.0 | was prepared by mixing 250 g. of ethyl p-isothiocyanatobenzoate, 50 g. of a polymerized sodium salt of substituted benzoid long-chain sulfonic acid (Daxad 27), and 245 g. of kaolinite. The mixture was milled to a particle size averaging 5 to 30 microns. It was suspended in 10 gals. of water, giving an aqueous spray containing about 6500 parts per million of active ingredient.

The herbicidal efficacy of the formulation was then determined by spraying the composition at the rate of 2.5 lbs. per acre (active ingredient) on test plots of soil planted to rows of crabgrass, wild oats, quackgrass, bindweed, lambsquarters, pigweed, and corn. After 21 days the inhibition of weed growth was noted, when compared with control plots of the same area and cultural treatment. The results are shown in Table 1.

Table 1

|  | Percent Inhibition |
|---|---|
| Corn | 0 |
| Crabgrass | 90 |
| Wild Oats | 90 |
| Quackgrass | 100 |
| Bindweed | 90 |
| Lambsquarters | 100 |
| Pigweed | 100 |

In the same manner aqueous spray compositions containing methyl p-isothiocyanatobenzoate,
propyl p-isothiocyanatobenzoate,
butyl p-isothiocyanatobenzoate,
ethyl 2,4-diisothiocyanatobenzoate,
ethyl p-isothiocyanato-3-bromobenzoate,
propyl p-isothiocyanato-3-bromobenzoate,
methyl p-isothiocyanato-2-bromo-5-nitrobenzoate,
ethyl p-isothiocyanato-2-chlorobenzoate,
ethyl p-isothiocyanato-2-chloro-5-nitrobenzoate,
ethyl p-isothiocyanato-3,5-dibromobenzoate,
methyl p-isothiocyanato-3,5-dichclorobenzoate,
ethyl p-isothiocyanato-3,5-dimethoxybenzoate,
ethyl p-isothiocyanato-3-ethoxybenzoate,
ethyl p-isothiocyanato-2-methoxybenzoate,
ethyl p-isothiocyanato-2-methoxy-5-nitrobenzoate,
ethyl p-isothiocyanato-2-nitrobenzoate,
methyl p-isothiocyanato-2,6-dimethylbenzoate, and methyl p-isothiocyanato-3,5-dinitrobenzoate were applied to weed infested soils. Similar herbicidal results were obtained.

EXAMPLE 2

A fine granular formulation has the following percentage composition:

|  | Percent |
|---|---|
| Methyl p-isothiocyanatobenzoate | 3.7 |
| Vermiculite (30/60 mesh) | 96.3 | was prepared by spraying a solution of 220 g. of methyl p-isothiocyanatobenzoate in 1000 ml. of methylene chloride on 5780 g. of vermiculite (30 to 60 mesh) while the vermiculite was being tumbled and stirred so as to assure even distribution. The methylene chloride was then evaporated, leaving the methyl p-isothiocyanatobenzoate adsorbed on the vermiculite, end the vermiculite was pulverized.

EXAMPLE 3

An emulsifiable concentrate having the following percentage composition:

|  | Percent |
|---|---|
| Ethyl p-isothiocyanatobenzoate | 15.0 |
| Technical alkyl naphthalene boiling at 238° to 293° C. (Velsicol AR50) | 19.7 |
| Xylene | 17.4 |
| Acetone | 17.4 |
| Ethylene dichloride | 25.4 |
| Blend of alkyl aryl sulfonates and alkylphenoxy polyethoxy ethanols (Triton X–151) | 5.1 | was prepared by mixing 15.0 lbs. of ethyl p-isothiocyanatobenzoate, 19.7 lbs. of Velsicol AR50, 17.4 lbs. of xylene, 17.4 lbs. of acetone, 25.4 lbs. of ethylene dichloride, and 5.1 lbs. of Triton X–151.

6.67 lbs. of the concentrate mixed with 10 gals. of water gave a spray emulsion containing 11,000 p.p.m. of ethyl p-isothiocyanatobenzoate.

EXAMPLE 4

An emulsifiable concentrate having the following percentage composition:

|  | Percent |
|---|---|
| Methyl p-isothiocyanatobenzoate | 40.0 |
| Technical alkyl naphthalene boiling at 238° to 293° C. (Velsicol AR50) | 13.7 |
| Xylene | 12.3 |
| Acetone | 11.3 |
| Ethylene dichloride | 17.7 |
| Blend of alkyl aryl sulfonates and alkylphenoxy polyethoxy ethanols (Triton X–151) | 5.0 | was prepared by mixing 40.0 lbs. of methyl p-isothiocyanatobenzoate, 13.7 lbs. of Velsicol AR50, 12.3 lbs. of xylene, 11.3 lbs. of acetone, 17.7 lbs. of ethylene dichloride, and 5.0 lbs. of Triton X–151.

1.67 lbs. of the concentrate mixed with 10 gals. of water gave a spray emulsion containing 8,000 p.p.m. of methyl p-isothiocyanatobenzoate.

EXAMPLE 5

A dispersible powder concentrate having the following percentage composition:

| | Percent |
|---|---|
| Ethyl p-isothiocyanatobenzoate | 50 |
| Kaolinite clay (finely divided) | 46 |
| Sodium salt of condensed mononaphthalene sulfonic acid (Lomar D) | 4 | was prepared by mixing 50 g. of ethyl p-isothiocyanatobenzoate, 46 g. of the kaolinite clay, and 4 g. of Lomar D. The mixture was milled to an average particle size of 5 to 30 microns.

EXAMPLE 6

A granular formulation having the following percentage composition:

| | Percent |
|---|---|
| Methyl p-isothiocyanatobenzoate | 1 |
| Pyrophyllite (30/60 mesh) | 99 | was prepared by dissolving 1.0 lb. of methyl p-isothiocyanatobenzoate in 10.0 l. of ethylene dichloride and spraying the solution on 99.0 lbs. of pyrophyllite. The granules were dried and then packaged for use.

I claim:
1. The method of controlling growth of plants which comprises applying to the situs thereof a herbicidally effective amount of a lower-alkyl p-isothiocyanatobenzoate of the formula:

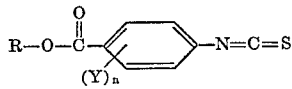

wherein Y is methyl, nitro, halogen, methoxy, ethoxy, or isothiocyanato; R is lower-alkyl of from 1 to 4 carbon atoms, inclusive; and $n$ is an integer from 0 to 2, inclusive.

2. The method of controlling growth of plants which comprises applying to the situs thereof from about 1 to about 50 lbs. per acre of a lower-alkyl p-isothiocyanatobenzoate of the formula:

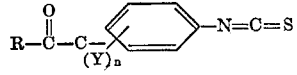

wherein Y is methyl, nitro, halogen, methoxy, ethoxy, or isothiocyanato; R is lower-alkyl of from 1 to 4 carbon atoms, inclusive; and $n$ is an integer from 0 to 2, inclusive.

3. The method of controlling growth of plants which comprises applying to the situs thereof from about 1 to about 50 lbs. per acre of lower-alkyl p-isothiocyanatobenzoate.

4. The method of controlling growth of plants which comprises applying to the situs thereof from about 1 to about 50 lbs. per acre of ethyl p-isothiocyanatobenzoate.

5. The method of claim 3 wherein lower-alkyl p-isothiocyanatobenzoate is applied at the rate of about 1 to about 8 lbs. per acre.

6. The method of claim 5 wherein ethyl p-isothiocyanatobenzoate is applied at the rate of about 1 to about 8 lbs. per acre.

References Cited

UNITED STATES PATENTS

| | | | |
|---|---|---|---|
| 2,394,916 | 2/1946 | Jones | 71—107 |
| 2,648,702 | 8/1953 | De Garmo et al. | 71—107 |
| 3,285,730 | 11/1966 | Weis et al. | 71—104 |

FOREIGN PATENTS 810,044  3/1959  Great Britain.

OTHER REFERENCES

Urbschat et al.: "Derivatives of p-Amino Benzoic Acid as Fungicides" (1957) CA54 pp. 3838–39 (1960).

Geigy: "4-Thiocyanatophenyl Isothiocyanates" (1964) CA60 (1964) p. 13182.

Sayigh: "Reaction of Arylamines with Diethylthiocarbamoyl Chloride" (1965) CA63 (1965) p. 9842.

Kuramoto: "Isothiocyanate Herbicides" (1961) CA60 (1964) p. 2267.

LEWIS GOTTS, *Primary Examiner.*

G. HOLLRAH, *Assistant Examiner.*

U.S. Cl. X.R.

71—107; 260—454